US012810149B2

(12) United States Patent
Chen et al.

(10) Patent No.: US 12,810,149 B2
(45) Date of Patent: Nov. 24, 2026

(54) METHOD AND SYSTEM FOR PREDICTING SPATIO-TEMPORAL PERCEPTION INFORMATION BASED ON GRAPH NEURAL NETWORK

(71) Applicant: ZHEJIANG LAB, Hangzhou (CN)

(72) Inventors: Hongyang Chen, Hangzhou (CN); Bingyang Hu, Hangzhou (CN); Qingguo Qi, Hangzhou (CN); Zhao Li, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 1015 days.

(21) Appl. No.: 17/990,617

(22) Filed: Nov. 18, 2022

(65) Prior Publication Data

US 2024/0054339 A1 Feb. 15, 2024

(30) Foreign Application Priority Data

Aug. 9, 2022 (CN) ........................ 202210947851.1

(51) Int. Cl.
*G06N 3/09* (2023.01)
*G06N 3/045* (2023.01)
(Continued)

(52) U.S. Cl.
CPC ............... *G06N 3/08* (2013.01); *G06N 3/045* (2023.01); *G06N 3/0464* (2023.01); *G06N 3/084* (2013.01);
(Continued)

(58) Field of Classification Search
CPC ........ G06N 3/08; G06N 3/045; G06N 3/0464; G06N 3/084; G06N 3/09; G06Q 10/04;
(Continued)

(56) References Cited

U.S. PATENT DOCUMENTS

2022/0207366 A1* 6/2022 Marley ................ G06N 3/0464
2023/0104448 A1* 4/2023 Sivakumar ............... G06N 3/08
706/25
2023/0177385 A1* 6/2023 Nagalapatti ............ G06N 3/042
706/12

FOREIGN PATENT DOCUMENTS

CA 3010163 A1 1/2019
CN 110261900 A 9/2019
(Continued)

OTHER PUBLICATIONS

Yu, Bing, Haoteng Yin, and Zhanxing Zhu. "Spatio-temporal graph convolutional networks: A deep learning framework for traffic forecasting." arXiv preprint arXiv:1709.04875 (2017). (Year: 2017).*
(Continued)

*Primary Examiner* — Matthew Ell
*Assistant Examiner* — Jonathan J Kim
(74) *Attorney, Agent, or Firm* — IPro, PLLC

(57) ABSTRACT

Disclosed are a method and system for predicting spatio-temporal perception information based on a graph neural network. The method includes the following steps: step S1: constructing a perception data monitoring network, and acquiring original perception data through data acquisition nodes in the perception data monitoring network; step S2: pre-processing the original perception data and converting the same into spatio-temporal graph perception data; step S3: constructing a graph neural network model, and training parameters of the graph neural network model by using the spatio-temporal graph perception data; and step S4: inputting given spatio-temporal graph perception data to the trained graph neural network model and outputting a predicted value, and sending early warning information when the predicted value exceeds a preset threshold.

10 Claims, 8 Drawing Sheets

(51) Int. Cl.

| | |
|---|---|
| ***G06N 3/0464*** | (2023.01) |
| ***G06N 3/08*** | (2023.01) |
| ***G06N 3/084*** | (2023.01) |
| ***G06Q 10/04*** | (2023.01) |
| ***G06Q 10/0637*** | (2023.01) |
| ***G06Q 30/0202*** | (2023.01) |
| ***G06Q 50/26*** | (2012.01) |
| ***G06Q 50/40*** | (2024.01) |
| ***G08G 1/01*** | (2006.01) |

(52) U.S. Cl.
CPC ......... *G06Q 10/04* (2013.01); *G06Q 10/0637* (2013.01); *G06Q 30/0202* (2013.01); *G06Q 50/26* (2013.01); *G06Q 50/40* (2024.01); *G08G 1/0116* (2013.01); *G08G 1/0129* (2013.01); *G08G 1/0145* (2013.01)

(58) Field of Classification Search
CPC ........... G06Q 10/0637; G06Q 30/0202; G06Q 50/26; G06Q 50/40; G08G 1/0116; G08G 1/0129; G08G 1/0145
See application file for complete search history.

(56) References Cited

FOREIGN PATENT DOCUMENTS

| | | | | | |
|---|---|---|---|---|---|
| CN | 111669373 A | | 9/2020 | | |
| CN | 112784121 A | | 5/2021 | | |
| CN | 113450561 A | | 9/2021 | | |
| CN | 113656461 A | * | 11/2021 | ......... | G06F 16/2474 |
| CN | 113837794 A | | 12/2021 | | |
| CN | 113919231 A | | 1/2022 | | |
| CN | 114021811 A | | 2/2022 | | |
| CN | 114120652 A | | 3/2022 | | |
| CN | 114169649 A | * | 3/2022 | ............. | G06N 3/044 |
| CN | 114580617 A | | 6/2022 | | |
| JP | 2006146889 A | | 6/2006 | | |
| JP | 2020194255 A | | 12/2020 | | |
| JP | 2023544175 A | | 10/2023 | | |
| WO | 2022142418 A1 | | 7/2022 | | |

OTHER PUBLICATIONS

Wu, Yuankai, and Huachun Tan. "Short-term traffic flow forecasting with spatial-temporal correlation in a hybrid deep learning framework." arXiv preprint arXiv:1612.01022 (2016). (Year: 2016).*

A. Salamanis, D. D. Kehagias, C. K. Filelis-Papadopoulos, D. Tzovaras and G. A. Gravvanis, "Managing Spatial Graph Dependencies in Large Volumes of Traffic Data for Travel-Time Prediction," in IEEE Transactions on Intelligent Transportation Systems, vol. 17, No. 6, pp. 1678-1687, Jun. 2016 (Year: 2016).*

Dong Wei et al. "Prediction of the waterborne navigation density based on the multi-feature spatio-temporal graph convolution network." Chinese Journal on Internet of Things, vol. 4, No. 3. Sep. 30, 2020.

Haoxiangchihuoguo. "Spatio-Temporal Graph Convolutional Networks—Detailed explanation" Zhihu. May 19, 2022.

Liu Zhiyu. "1.6.2.4 Topology of WSN". Research and Application of Wireless Sensor Network Technology. Aug. 31, 2019.

* cited by examiner

METHOD AND SYSTEM FOR PREDICTING SPATIO-TEMPORAL PERCEPTION INFORMATION BASED ON GRAPH NEURAL NETWORK

CROSS-REFERENCE TO RELATED APPLICATIONS

The present disclosure claims priority to Chinese Patent Application No. CN202210947851.1 filed to the China National Intellectual Property Administration on Aug. 9, 2022 and entitled "Method and System for Predicting Spatio-Temporal Perception Information Based on Graph Neural Network", which is incorporated herein by reference in its entirety.

TECHNICAL FIELD

The present disclosure relates to the field of deep learning technology, in particular to a method and system for predicting spatio-temporal perception information based on a graph neural network.

BACKGROUND

With the continuous development and progress of science and technology, the information of all things in the world may be perceived by monitoring equipment. Such information is called perception data. The monitoring and perception of earthquakes is one of the typical examples, because earthquakes pose the greatest threat to the safety of human life, health and property and are also one of the most unpredictable natural disasters. According to relevant statistics, an average of more than 5 million earthquakes occur every year in the world, and dozens of them cause serious disasters to human beings and bring huge impacts on social and economic development, security order, ecological environment and the like. In addition, social traffic flow monitoring data is also one of the most common perception data. It not only affects path planning, travel time and other aspects in people's daily travel, but also has important significance for social traffic management and regulation. Therefore, it is possible to mine and analyze perception data represented by earthquake data and traffic data to the greatest extent, and then to perform data prediction in the future time, which has great research value on whether the human society can conduct effective emergency deployment and management in response to the threats of earthquakes and the like or on reasonable arrangement, guidance and even control of daily life events such as daily traffic travel.

Generally speaking, mass perception data records feature information of a thing at different time points and different locations, so the perception data contains a large amount of spatio-temporal feature information. Therefore, the prediction, through historical perception data, on a thing that may occur in the future mainly lies in the prediction on its spatio-temporal feature information. That is, whether a thing may occur within a period of time in the future is predicted, and main feature information of the thing, such as time and location of occurrence, is predicted relatively accurately. As we all know, statistics is a typical method of predicting future events by mathematically modeling a large amount of data. Thanks to the natural mathematical modeling attributes of statistics and the rapid development of artificial intelligence technology in recent years, more and more researchers have applied machine learning, deep learning and other methods to the modeling of perception data of earthquakes, traffic, etc., and these models are desired to more fully explore potential connections between perception data, extract relevant features, and find some internal rules for the occurrence of some things, so as to improve the accuracy of predictive analysis. Researchers first used machine learning classification models such as Support Vector Machine (SVM) to distinguish simple features of perception data, and later used deep learning models such as Recurrent Neural Network (RNN) to further explore inherent connections of perception data in time series, but these methods ignore the natural spatial correlation of such perception data. In fact, for any method that tries to effectively predict perception data of earthquakes and traffic, spatial correlation information should be important information that cannot be ignored in addition to temporal correlation. Unfortunately, prediction methods that use both temporal and spatial information features in perception data at the same time are not very common, especially in deep learning prediction models, relevant information is also less used. Therefore, it is particularly important to invent a method and system for predicting spatio-temporal feature information of future events based on the temporal and spatial characteristics of perception data.

To this end, a method and system for predicting spatio-temporal perception information based on a graph neural network are proposed.

SUMMARY

The present disclosure provides a method and system for predicting spatio-temporal perception information based on a graph neural network in order to solve the above technical problems.

The technical solutions adopted in the present disclosure are as follows:

A method for predicting spatio-temporal perception information based on a graph neural network includes the following steps:

Step S1: constructing a perception data monitoring network, and acquiring original perception data through data acquisition nodes in the perception data monitoring network;

Step S2: pre-processing the original perception data and converting the original perception data into spatio-temporal graph perception data;

Step S3: constructing a graph neural network model, and training parameters of the graph neural network model by using the spatio-temporal graph perception data; and Step S4: inputting given spatio-temporal graph perception data to the trained graph neural network model and outputting a predicted value, and sending early warning information when the predicted value exceeds a preset threshold.

Further, the construction of the perception data monitoring network in step S1 includes the following two ways: construction of a real perception data monitoring network or construction of a virtual perception data monitoring network.

Further, the construction of the real perception data monitoring network specifically includes a plurality of data acquisition nodes composed of a data monitor and a communication network module, each of the data acquisition nodes is arranged in a monitoring region at preset distance, equal intervals and in a matrix, and the data acquisition nodes monitor and collect data for the current region, and use a unified format to represent data feature information.

Further, the construction of the virtual perception data monitoring network specifically includes performing coordinate grid division on the monitoring region to obtain a plurality of grid regions, virtualizing a virtual data acquisition node corresponding to each of the grid regions, mapping historical perception data recorded by other data sources into the corresponding grid regions according to the location of occurrence of each historical perception data, and regarding the historical perception data as original perception data recorded by the virtual data acquisition nodes corresponding to the grid regions.

Further, the pre-processing process in step S2 specifically includes performing time slicing on the original perception data and processing the original perception data into a matrix sequence in a chronological order, wherein each element in the matrix sequence corresponds to the data acquisition node, the arrangement position of each element in the matrix sequence corresponds to the spatial feature information of a data acquisition node in the perception data monitoring network, the value of each element in the matrix sequence corresponds to the temporal feature information of the data acquisition node in the perception data monitoring network at the current time, then the matrix sequence containing the spatial feature information and the temporal feature information constitutes the spatio-temporal graph perception data.

Further, the matrix sequence constitutes a spatio-temporal graph: $G_t=(V_t,E,W)$, where $V_t$ represents a set of data acquisition nodes at time t, and the feature of each data acquisition node represents the feature information of the perception data recorded by the data acquisition node; E represents a set of edges, and each edge represents the relationship between two data acquisition nodes; and W represents an adjacency matrix, which records the weight of each edge in the set of edges.

Further, the adjacency matrix is:

$$W_{ij}=\begin{cases} I(i,j)\cdot\exp\left(\frac{d_{ij}^2}{\sigma^2}\right), & i\neq j \text{ and } \exp\left(\frac{d_{ij}^2}{\sigma^2}\right)\geq\varepsilon, \\ 0, & \text{other cases} \end{cases}$$

Herein, I(i,j) represents the degree of correlation between respective locations of the data acquisition node i and the data acquisition node j within a value range of 0-1, $d_{ij}$ represents the distance between the data acquisition node i and the data acquisition node j, σ and ε are used to adjust the distribution and sparsity of the adjacency matrix W.

Further, the graph neural network model in step S3 includes an input layer, a spatio-temporal graph convolution module and an output layer, wherein the spatio-temporal graph convolution module is composed of two temporal domain convolution modules and a spatial domain convolution module therebetween, and the output layer is composed of a temporal domain convolution module and a fully connected layer.

Further, the temporal domain convolution module in the graph neural network model is specifically implemented as follows: dividing the input into two paths, performing a sigmod operation on one path and an addition operation with a residual on the other path after one-dimensional convolution, and finally outputting the results of the two paths through a Hadamard product; specifically, the one-dimensional convolution is performed on the input spatio-temporal graph data $X\in R^{M\times n\times C_i}$ along the time dimension, where M represents a total of M times in the spatio-temporal graph, n represents a total of n data acquisition nodes in the monitoring region, and $C_i$ represents the dimension at which the data acquisition nodes record features; the size of a temporal domain convolution kernel is $\Gamma\in R^{K_t\times C_i}$, the number of the temporal domain convolution kernels is $2C_o$, then the spatio-temporal graph output by the temporal domain convolution module is $Y\in R^{(M-K_t+1)\times n\times C_o}$, that is, graph data $R^{n\times C_o}$ corresponding to $(M-K_t+1)$ times are obtained.

Further, the spatial domain convolution module in the graph neural network model is specifically implemented as follows: performing a graph convolution operation on the input to obtain spatial feature information and outputting the spatial feature information; specifically, the graph data corresponding to each time on the spatio-temporal graph output by the first temporal domain convolution module in the spatio-temporal graph convolution module is used as input $X\in R^{n\times C_o}$ and subjected to graph convolution according to the Chebyshev approximation, the size of each spatial convolution kernel selected during the graph convolution is $\theta\in R^{K\times C_o}$, where K=2, and the number of the convolution kernels is $C_i$, therefore, the output of the spatial domain convolution module is $Y\in R^{(M-K_t+1)\times n\times C_i}$.

Further, when the spatio-temporal graph perception data in the graph neural network model passes through the spatio-temporal graph convolution module, it successively passes through the temporal domain convolution module, the spatial-domain convolution module, and the temporal domain convolution module; each time the spatio-temporal graph perception data passes through the temporal domain convolution module, the time dimension is reduced by $(K_t-1)$; therefore, after the output of the spatial domain convolution module is input to the second temporal domain convolution module, the length of the time dimension is reduced by $2(K_t-1)$, and the finally obtained output of the entire spatio-temporal graph convolution module is $Y\in R^{(M-2(K_t-1))\times n\times C_o}$.

Further, the output of the spatio-temporal graph convolution module in the graph neural network model finally passes through the output layer, that is, successively passes through a temporal domain convolution module and a fully connected layer, the size of each convolution kernel of the temporal domain convolution module is $\Gamma\in R^{(M-2(K_t-1))\times C_o}$, the number of convolution kernels is $C_o$, the output after the temporal domain convolution module is passed is $Z\in R^{n\times C_o}$, the fully connected layer is $\hat{v}=Zw+b$, where the parameters are $w\in R^{C_o}$ and $b\in R^n$, and finally a predicted value $\hat{v}\in R^n$ is output; when the graph neural network model is trained, the loss function selected is a distance measure between the predicted value $\hat{v}$ and the real value $v_{t+1}$: $L=\|\hat{v}-v_{t+1}\|^2$; during the training process, the training data is input to the model in batches, and the parameters of the model are gradually adjusted, so that the loss function gradually decreases on the training set until convergence, or the value of the loss function is lower than a set threshold, and then the training is stopped to obtain the final graph neural network model.

The present disclosure further provides a system for predicting spatio-temporal perception information based on a graph neural network, including:

- a perception data monitoring network module utilized to construct a perception data monitoring network and acquire original perception data by using the perception data monitoring network;
- a perception data pre-processing module utilized to perform time slicing on the original perception data and process the original perception data into a matrix sequence in a chronological order, wherein the matrix sequence containing spatial feature information and temporal feature information constitutes spatio-temporal graph perception data;

a spatio-temporal feature information prediction and analysis module based on graph neural network fusion perception data utilized to train parameters of a graph neural network model by using the spatio-temporal graph perception data to obtain a trained graph neural network model; and a perception data prediction module utilized to input given spatio-temporal graph perception data to the trained graph neural network model to predict spatio-temporal graph perception data $\hat{v}_t$ within a period of time in the future, $\hat{v}_t$ being described in the form of a matrix sequence, where t represents a certain time in the future and is temporal information, the element at each element location of the matrix corresponds to the region where the data acquisition node is located and is spatial information, and the value of the element represents specific feature information, which describes the spatio-temporal feature information of a predicted future thing in detail; and when it is predicted that the specific feature information of a region at a certain time exceeds a preset threshold, send early warning information to the region.

The present disclosure further provides an apparatus for predicting spatio-temporal perception information based on a graph neural network, which is deployed and used by means of the following devices, including a perception data monitor, a network communication device, a memory, a processor, a display, and a computer software program stored in the memory and executable on the processor, wherein the perception data monitor and the network communication device construct a perception data monitoring network, the data obtained by the perception data monitoring network is stored in the memory, the processor executes the computer software program to implement the method for predicting spatio-temporal perception information based on a graph neural network according to any one of the above embodiments, and the display displays the data results obtained by the processor executing the computer software program in a visual manner.

The present disclosure further provides a computer software program, which implements the method for predicting spatio-temporal perception information based on a graph neural network according to any one of the above embodiments, and is deployed in a processor or a cloud server.

The beneficial effects of the present disclosure are as follows: the present disclosure provides a method and system for predicting spatio-temporal perception information based on a graph neural network, which creatively convert original perception data into spatio-temporal graph perception data so as to take the temporal and spatial correlations contained in the perception data into consideration, and use the graph neural network to fully mine the temporal and spatial feature information in the perception data so as to improve the accuracy of prediction on the temporal and spatial feature information of things that will occur in the future. The present disclosure has better generalization ability and self-learning ability by rationally using the latest graph neural network model. The present disclosure has better accuracy when being used for the prediction of perception data of earthquakes, traffic, etc.

DETAILED DESCRIPTION

The following description of at least one exemplary embodiment is actually only illustrative, and serves by no means as any limitation to the present disclosure and the application or usage thereof. Based on the embodiments of the present disclosure, all other embodiments obtained by those of ordinary skill in the art without any creative effort shall fall within the protection scope of the present disclosure.

Figure 1:
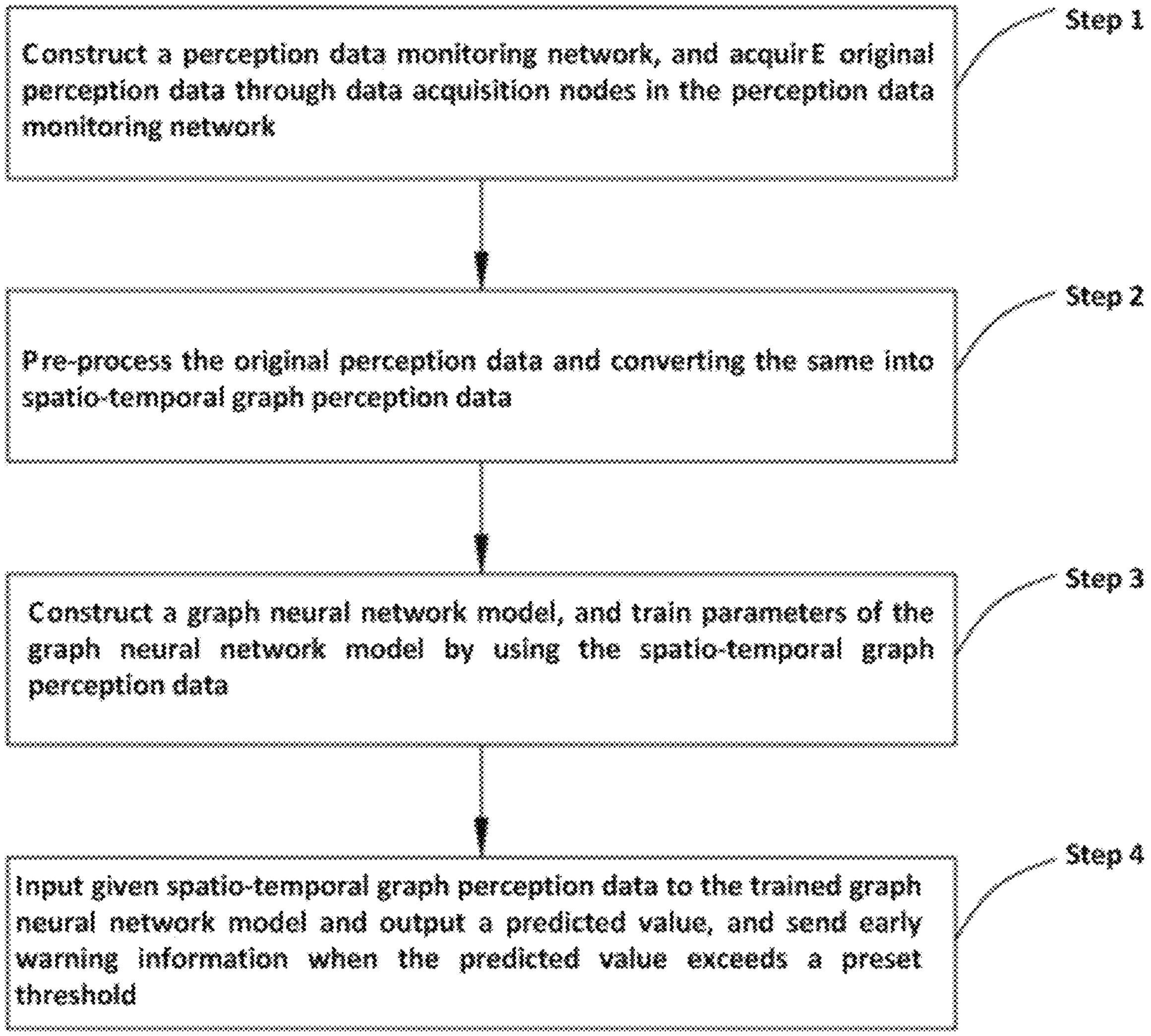
FIG. 1 is a schematic flowchart of a method for predicting spatio-temporal perception information based on a graph neural network according to the present disclosure.

With reference to FIG. 1, a method for predicting spatio-temporal perception information based on a graph neural network includes the following steps:

Step S1: Construct a perception data monitoring network, and acquire original perception data through data acquisition nodes in the perception data monitoring network.

The construction of the perception data monitoring network includes the following two ways: construction of a real perception data monitoring network or construction of a virtual perception data monitoring network.

The construction of the real perception data monitoring network specifically includes a plurality of data acquisition nodes composed of a data monitor and a communication network module, each of the data acquisition nodes is arranged in a monitoring region at preset distances, equal intervals and in a matrix, and the data acquisition nodes monitor and collect data for the current region, and use a unified format to represent data feature information.

The construction of the virtual perception data monitoring network specifically includes performing coordinate grid division on the monitoring region to obtain a plurality of grid regions, virtualizing a virtual data acquisition node corresponding to each of the grid regions, mapping historical perception data recorded by other data sources into the corresponding grid regions according to the location of occurrence of each historical perception data, and regarding the historical perception data as original perception data recorded by the virtual data acquisition nodes corresponding to the grid regions.

Step S2: Pre-process the original perception data and convert the original perception data into spatio-temporal graph perception data.

The pre-processing process specifically includes performing time slicing on the original perception data and processing the original perception data into a matrix sequence in a chronological order, wherein each element in the matrix sequence corresponds to the data acquisition node, the arrangement position of each element in the matrix sequence corresponds to the spatial feature information of a data acquisition node in the perception data monitoring network, the value of each element in the matrix sequence corresponds to the temporal feature information of the data acquisition node in the perception data monitoring network at the current time, then the matrix sequence containing the spatial feature information and the temporal feature information constitutes the spatio-temporal graph perception data.

The matrix sequence constitutes a spatio-temporal graph: $G_t=(V_t,E,W)$, where $V_t$ represents a set of data acquisition nodes at time t, and the feature of each data acquisition node represents the feature information of the perception data recorded by the data acquisition node; E represents a set of edges, and each edge represents the relationship between two data acquisition nodes; and W represents an adjacency matrix, which records the weight of each edge in the set of edges.

The adjacency matrix is:

$$W_{ij}=\begin{cases} I(i,j)\cdot\exp\left(\frac{d_{ij}^2}{\sigma^2}\right), & i\neq j \text{ and } \exp\left(\frac{d_{ij}^2}{\sigma^2}\right)\geq\varepsilon, \\ 0, & \text{other cases} \end{cases}$$

Herein, I(i,j) represents the degree of correlation between respective locations of the data acquisition node i and the data acquisition node j within a value range of 0-1, $d_{ij}$ represents the distance between the data acquisition node i and the data acquisition node j, σ and ε are used to adjust the distribution and sparsity of the adjacency matrix W.

Step S3: Construct a graph neural network model, and train parameters of the graph neural network model by using the spatio-temporal graph perception data.

Figure 2:
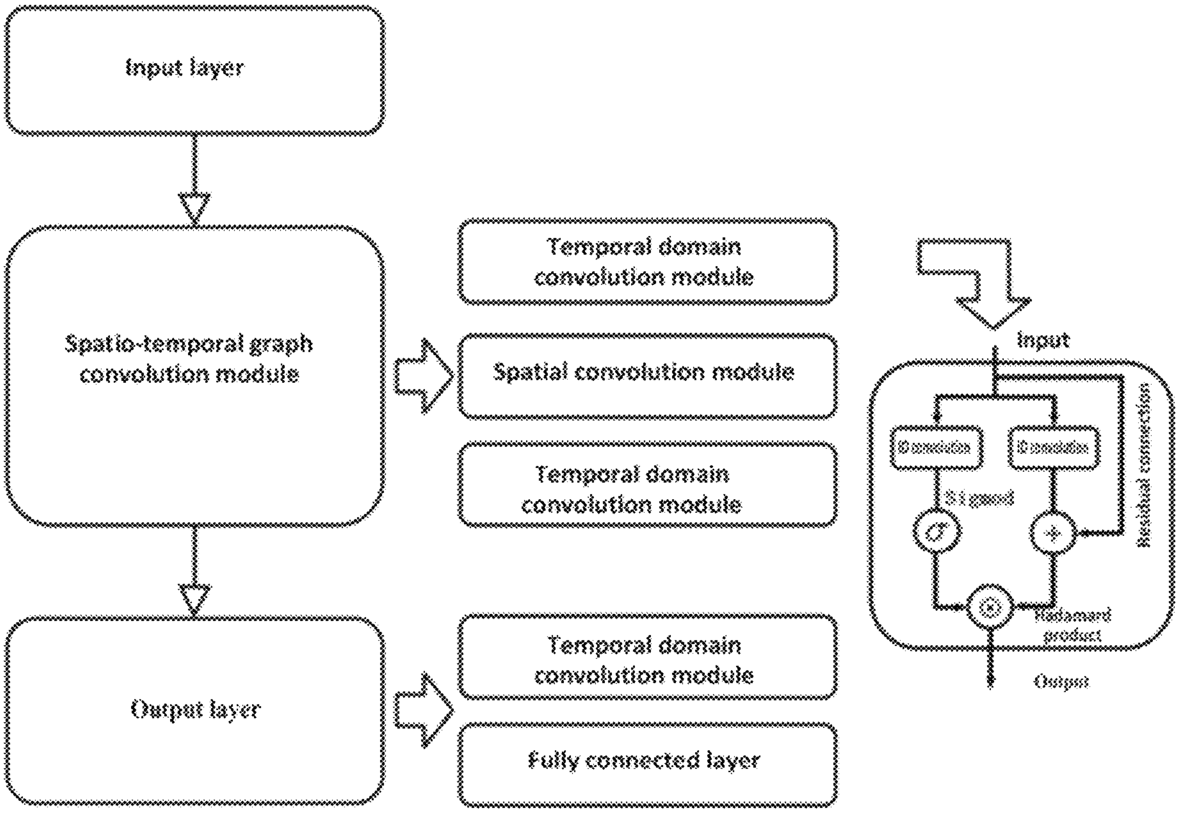
FIG. 2 is a structural block diagram of a neural network model according to the present disclosure.

With reference to FIG. 2, the graph neural network model includes an input layer, a spatio-temporal graph convolution module and an output layer, wherein the spatio-temporal graph convolution module is composed of two temporal domain convolution modules and a spatial domain convolution module therebetween, and the output layer is composed of a temporal domain convolution module and a fully connected layer.

The temporal domain convolution module in the graph neural network model is specifically implemented as follows: dividing the input into two paths, performing a sigmod operation on one path and an addition operation with a residual on the other path after one-dimensional convolution, and finally outputting the results of the two paths through a Hadamard product; specifically, the one-dimensional convolution is performed on the input spatio-temporal graph data $X\in R^{M\times n\times C_i}$ along the time dimension, where M represents a total of M times in the spatio-temporal graph, n represents a total of n data acquisition nodes in the monitoring region, and $C_i$ represents the dimension at which the data acquisition nodes record features; the size of a temporal domain convolution kernel is $\Gamma\in R^{K_t\times C_i}$, the number of the temporal domain convolution kernels is $2C_o$, then the spatio-temporal graph output by the temporal domain convolution module is $Y\in R^{(M-K_t+1)\times n\times C_o}$, that is, graph data $R^{n\times C_o}$ corresponding to $(M-K_t+1)$ times are obtained.

The spatial domain convolution module in the graph neural network model is specifically implemented as follows: performing a graph convolution operation on the input to obtain spatial feature information and outputting the spatial feature information; specifically, the graph data corresponding to each time on the spatio-temporal graph output by the first temporal domain convolution module in the spatio-temporal graph convolution module is used as input $X\in R^{n\times C_o}$ and subjected to graph convolution according to the Chebyshev approximation, the size of each spatial convolution kernel selected during the graph convolution is $\theta\in R^{K\times C_o}$, where K=2, and the number of the convolution kernels being $C_i$, therefore, the output of the spatial domain convolution module is $Y\in R^{(M-K_t+1)\times n\times C_i}$.

When the spatio-temporal graph perception data in the graph neural network model passes through the spatio-temporal graph convolution module, it successively passes through the temporal domain convolution module, the spatial-domain convolution module, and the temporal domain convolution module; each time the spatio-temporal graph perception data passes through the temporal domain convolution module, the time dimension is reduced by $(K_t-1)$; therefore, after the output of the spatial domain convolution module is input to the second temporal domain convolution module, the length of the time dimension is reduced by $2(K_t-1)$, and the finally obtained output of the entire spatio-temporal graph convolution module is $Y\in R^{(M-2(K_t-1))\times n\times C_o}$.

The output of the spatio-temporal graph convolution module in the graph neural network model finally passes through the output layer, that is, successively passes through a temporal domain convolution module and a fully connected layer, the size of each convolution kernel of the temporal domain convolution module is $\Gamma\in R^{(M-2(K_t-1))\times C_o}$, the number of convolution kernels is $C_o$, the output after the temporal domain convolution module is passed is $Z\in R^{n\times C_o}$, the fully connected layer is $\hat{v}=Zw+b$, where the parameters are $w\in R^{C_o}$ and and $b\in R^n$, and finally a predicted value $\hat{v}\in R^n$ is output; when the graph neural network model is trained, the loss function selected is a distance measure between the predicted value $\hat{v}$ and the real value $v_{t+1}$: $L=\|\hat{v}-v_{t+1}\|^2$; during the training process, the training data is input to the model in batches, and the parameters of the model are gradually adjusted, so that the loss function gradually decreases on the training set until convergence, or the value of the loss function is lower than a set threshold, and then the training is stopped to obtain the final graph neural network model.

Step S4: Input given spatio-temporal graph perception data to the trained graph neural network model and output a predicted value, and send early warning information when the predicted value exceeds a preset threshold. The early warning information may be sent via peer to peer or via broadcast. The broadcast may be done by wired or wireless media such as a cable wire, a radio, television, internet link etc.

The given spatio-temporal graph perception data is input to predict spatio-temporal graph perception data $\hat{v}_t$ within a period of time in the future, $\hat{v}_t$ being described in the form of a matrix sequence, where t represents a certain time in the future, and is temporal information; the element at each element location of the matrix corresponds to the region where the data acquisition node is located, and is spatial information; and the value of the element represents specific feature information, which describes the spatio-temporal feature information of a predicted future thing in detail. When it is predicted that the specific feature information of a region at a certain time exceeds a preset threshold, early warning information is sent to the region. When the specific feature information does not exceed the preset threshold, the system continues to perform data monitoring and perception, data pre-processing, data prediction, etc.

Embodiment 1: Step S1: Construct a perception data monitoring network, and acquire original perception data through data acquisition nodes in the perception data monitoring network.

Figure 3:
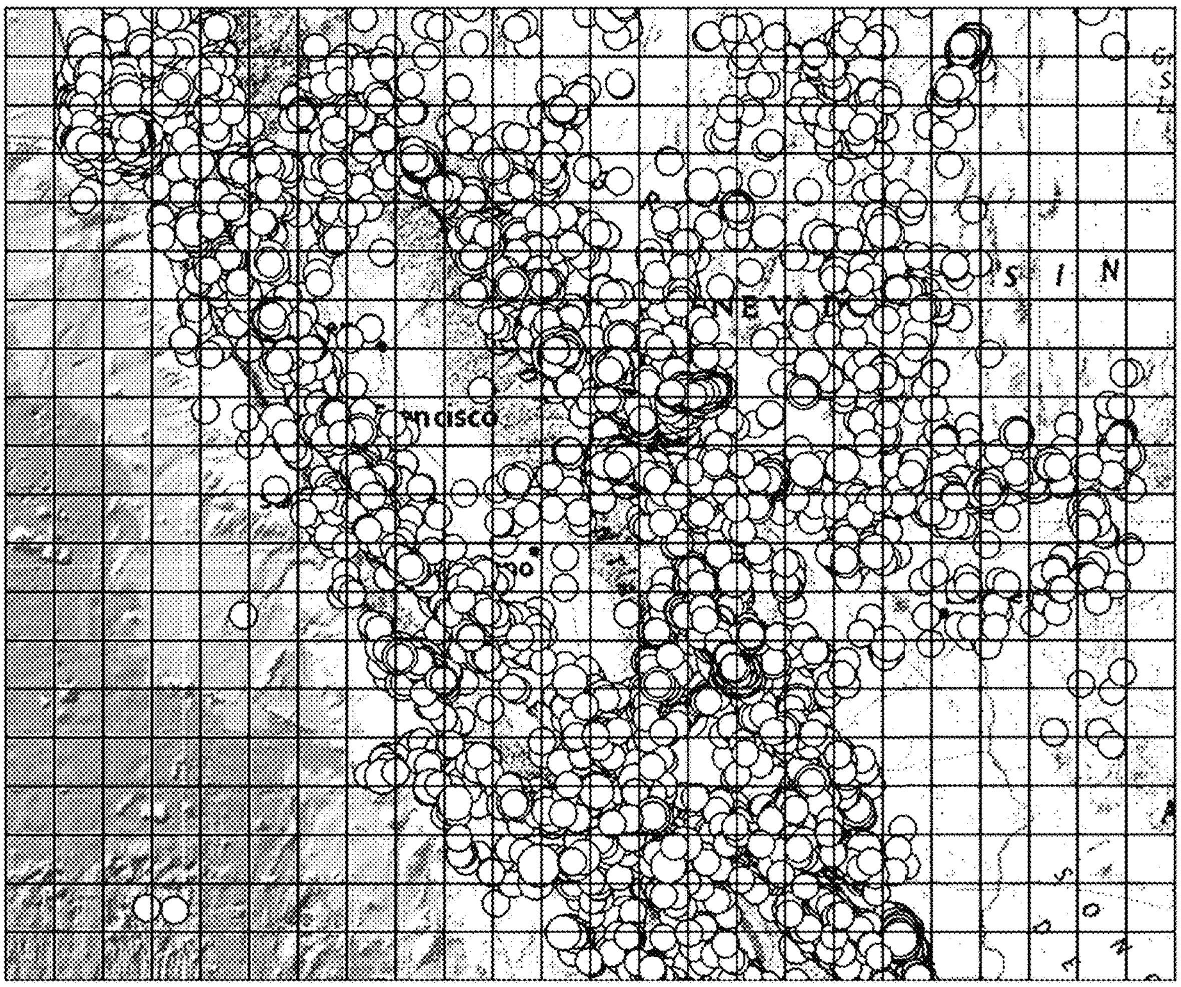
FIG. 3 is a distribution diagram of earthquake perception data and a schematic diagram of node division of a virtual perception data monitoring network applied to Embodiment 1 according to the present disclosure.

A virtual earthquake perception data monitoring network is constructed: California and its adjacent regions (125°-113° west longitude and 32°-42° north latitude) are selected as a monitoring region, as shown in FIG. 3. Grid division is performed on the rectangular monitoring region according to the longitude and latitude coordinates. In units of 0.5 degrees of longitude and latitude, the longitude is divided into 24 grids, and the latitude is divided into 20 grids, that is, the monitoring region is divided into grid regions, where a virtual data acquisition node is correspondingly set at each grid region. Then historical earthquake data of earthquakes with magnitudes greater than or equal to 3 that occurred in California and adjacent regions (125°-113° west longitude and 32°-42° north latitude), recorded by the United States Geological Survey (USGS) from Jan. 1, 1990 to Dec. 31, 2021, are selected as an example of perception data. The historical earthquake data records the time, latitude and longitude, depth, and magnitude of each earthquake, totaling about 20,000 pieces. Each piece of historical earthquake data is mapped into a corresponding grid region according to the location of an epicenter, and this earthquake information is regarded as original earthquake perception data recorded by the corresponding virtual data acquisition node in the grid region. It should be noted that, for the purpose of simplifying the amount of calculation, the feature information of the perception data recorded here is only the one-dimensional information of the magnitude of the earthquake.

Step S2: Pre-process the original perception data and convert the original perception data into spatio-temporal graph perception data.

The original earthquake perception data are converted into earthquake spatio-temporal graph perception data. This method is to perform time slicing on the original earthquake perception data recorded by the virtual earthquake perception data monitoring network. It is worth noting that different data will be obtained if time slices of different sizes are selected. If a time slice is too small, no earthquake recorded may occur in the entire time slice. If a time slice is too large, the same data acquisition node may collect multiple pieces of earthquake information in the same time slice. Therefore, time slices of appropriate sizes are selected. In addition, because of the use of virtual data acquisition nodes, a data acquisition node may record multiple pieces of original earthquake perception data in the same time slice, while another virtual data acquisition node does not record any original earthquake perception data. Therefore, it is very difficult to select the time slices of appropriate sizes. The actual operation is to remove duplicated data and perform appropriate down-sampling operations to ensure compliance with a data format. However, if a real earthquake perception data monitoring network is established in this embodiment, the above problem will not occur, because all data acquisition nodes deployed update the earthquake monitoring data periodically and synchronously, so that the time slice of each data acquisition node is the same, and all the data acquisition nodes record the same amount of earthquake data within the same time slice.

Then the original earthquake perception data are processed into a matrix sequence in a chronological order, the matrix sequence being composed of a series of temporally continuous matrices, and each matrix representing original earthquake perception data in a time slice. In this embodiment, the monitoring region is divided into 24×20=480 grids, and only the feature information of earthquake magnitude is selected as earthquake perception feature information, so the dimension of each matrix is 24×20×1=480 elements. The elements of each matrix correspond to the virtual data acquisition nodes in the 24×20=480 grids of the monitoring region, which contains two meanings: on the one hand, the arrangement positions of the elements in the matrix sequence represent the grids corresponding to the monitoring region and the corresponding virtual data acquisition nodes; and on the other hand, the values of the elements represent the earthquake perception feature information monitored by the corresponding data acquisition nodes at the current time. The one-dimensional earthquake perception feature information selected in this embodiment is earthquake magnitude information. A series of processed earthquake matrix sequence data are the earthquake spatio-temporal graph perception data. The matrices themselves represent spatial information, and the sequence of the matrices represents temporal information. In different time periods, the values of the elements in the earthquake spatio-temporal graph perception data change, indicating that the earthquake data monitored by the acquisition nodes at different positions change in different times, that is, the magnitude of the earthquake changes in this embodiment. The earthquake spatio-temporal graph perception data will be input to a subsequent information processing module.

The matrix sequence constitutes a spatio-temporal graph: $G_t=(V_t,E,W)$, where $V_t$ specifically represents a set of data acquisition nodes, i.e., virtual earthquake monitors at time t; E represents a set of edges, that is, the relationship between two earthquake monitors; W represents an adjacency matrix and records the weight of each edge in the set of edges, and the adjacency matrix W remains unchanged at different times;

The adjacency matrix is:

$$W_{ij}=\begin{cases} I(i,j)\cdot\exp\left(\frac{d_{ij}^2}{\sigma^2}\right), & i\neq j \text{ and } \exp\left(\frac{d_{ij}^2}{\sigma^2}\right)\geq\varepsilon, \\ 0, & \text{other cases} \end{cases}$$

Herein, I(i,j) represents the degree of correlation between respective locations of the virtual earthquake monitor i and the virtual earthquake monitor j, which is specifically expressed as the degree of correlation between earthquake zones, within a value range of 0-1; in this embodiment, I(i,j) is simplified to be 1 when the data acquisition nodes are in the same earthquake zone, and 0 when the data acquisition nodes are in different earthquake zones. Whether the data acquisition nodes are in the same earthquake zone is determined by a clustering algorithm for clustering all earthquake occurrence locations; $d_{ij}$ represents the distance between data acquisition node i and data acquisition node j, σ and ε are used to adjust the distribution and sparsity of the adjacency matrix W. In this embodiment, according to the earthquake distribution diagram shown in FIG. 3 and the purpose of reducing the experimental calculation overhead, this embodiment selects the number of earthquake clusters to be 2, so the number of earthquake zones is 2. In the actual operation requiring higher precision, earthquake zone information divided by geologists is recommended.

In this embodiment, $\sigma=10$ and $\varepsilon=0.5$. This experiment only selects the earthquake magnitude as the earthquake perception feature information, so the feature dimension is 1.

Step S3: Construct a graph neural network model according to the summary of the disclosure, and train parameters of the graph neural network model by using the earthquake perception data processed into a spatio-temporal graph, where the selected loss function is still the distance measure between the predicted value $\hat{v}$ and the real value $v_{t+1}$: $L=\|\hat{v}-v_{t+1}\|^2$. During the training process, training data are input to the model in batches, and the parameters of the model are gradually adjusted so that the loss function gradually decreases on the training set until convergence, or the value of the loss function is lower than a set threshold, then the training is stopped, and the final graph neural network model is saved.

Step S4: Input historical earthquake perception data processed into a spatio-temporal graph to the trained graph neural network model and output earthquake perception data for predicting the future, and send simulated early warning information when the predicted value of a region at a certain time, that is, the magnitude of an earthquake, exceeds a preset threshold.

The early warning information may be sent via peer to peer or via broadcasting. The broadcasting may be done by wired or wireless media such as a cable wire, a radio, television, internet link etc. Broadcasting may be implemented by various prior methods. For example, broadcasting may be implemented using a RDS scheme based on traditional cable FM broadcasting system. Based on the RDS coding technology, the system uses the RDS encoding and decoding function of the broadcast control host to encode and decode the broadcast signal, and then transmits the wireless frequency modulation signal through the coaxial cable or the wireless transmitter station.

In another example, broadcasting may be implemented using TS streaming broadcast scheme based on digital television system. Based on TS flow, the system transmits signals in accordance with determined encapsulation protocol and data format, under coordination of the broadcast system management platform, and form daily news broadcast instruction according to the need. The instructions are transmitted to digital TV front end, and multiple signals after multiplex confluence processing are modulated in the QAM modulator.

In another example, broadcasting may be implemented using all IP solution based on Internet.

Based on TCP/UDP technology, the system transmits audio signals in the form of IP packets in the local area network or wide area network. The core platform of the system is deployed in a computer room of management center, and each branch center can broadcast or shout to its jurisdiction through the IP network.

In one more example, it is possible to broadcast using, for example, the downlink physical multicast channel in a cellular network such as 4G LTE or 5G. In addition, the downstream physical channel for Internet of Things protocols, such as NB-IoT (Narrow Band Internet of Things), can also be used to broadcast messages.

Figure 4:
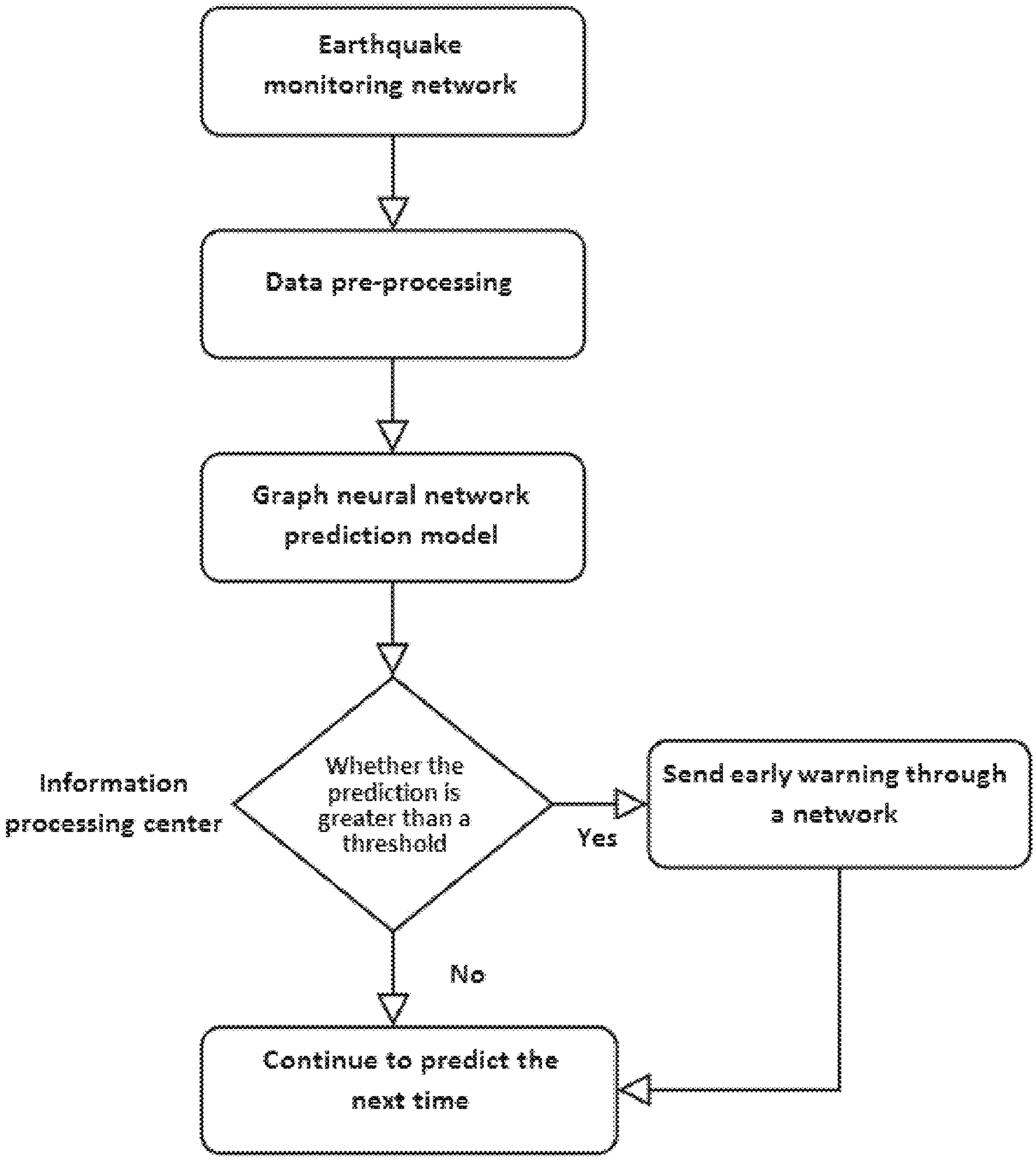
FIG. 4 is a system structure block diagram of the earthquake perception data applied to Embodiment 1 according to the present disclosure.

Finally, when this embodiment is applied to earthquake perception data to carry out spatio-temporal feature information prediction, the overall system structure block diagram is shown in FIG. 4. The entire system is managed by a centralized information processing center. First, a virtual earthquake perception data monitoring network is used to monitor earthquake information and save the information in a storage module of the information processing center. Second, a data pre-processing module pre-processes original earthquake perception data in a memory of the information processing center, and converts the same into earthquake spatio-temporal graph data in the form of a matrix sequence for output. Then, the information processing center selects a large amount of earthquake spatio-temporal graph data as a set of training samples, constructs a graph neural network model, trains the graph neural network model by using the training samples, and inputs given earthquake spatio-temporal graph data after the training is completed, to predict earthquake spatio-temporal graph data within a period of time in the future, that is, information such as the time, location, and magnitude of future earthquakes. Finally, according to the prediction information, a perception data prediction module sends early warning information to the region where the corresponding data acquisition node is located and its adjacent regions if the magnitude of the earthquake in the predicted value exceeds a threshold, to remind people to prepare in advance, so as to reduce the loss of life, health and property in the event of an earthquake. The early warning information may be sent via peer to peer or via broadcasting. The broadcasting may be done by wired or wireless media such as a cable wire, a radio, television, internet link etc. Broadcasting may be implemented by various prior methods. For example, broadcasting may be implemented using a RDS scheme based on traditional cable FM broadcasting system. Based on the RDS coding technology, the system uses the RDS encoding and decoding function of the broadcast control host to encode and decode the broadcast signal, and then transmits the wireless frequency modulation signal through the coaxial cable or the wireless transmitter station.

In another example, broadcasting may be implemented using TS streaming broadcast scheme based on digital television system. Based on TS flow, the system transmits signals in accordance with determined encapsulation protocol and data format, under coordination of the broadcast system management platform, and form daily news broadcast instruction according to the need. The instructions are transmitted to digital TV front end, and multiple signals after multiplex confluence processing are modulated in the QAM modulator.

In another example, broadcasting may be implemented using all IP solution based on Internet.

Based on TCP/UDP technology, the system transmits audio signals in the form of IP packets in the local area network or wide area network. The core platform of the system is deployed in a computer room of management center, and each branch center can broadcast or shout to its jurisdiction through the IP network.

In one more example, it is possible to broadcast using, for example, the downlink physical multicast channel in a cellular network such as 4G LTE or 5G. In addition, the downstream physical channel for Internet of Things protocols, such as NB-IoT (Narrow Band Internet of Things), can also be used to broadcast messages.

Figure 5:
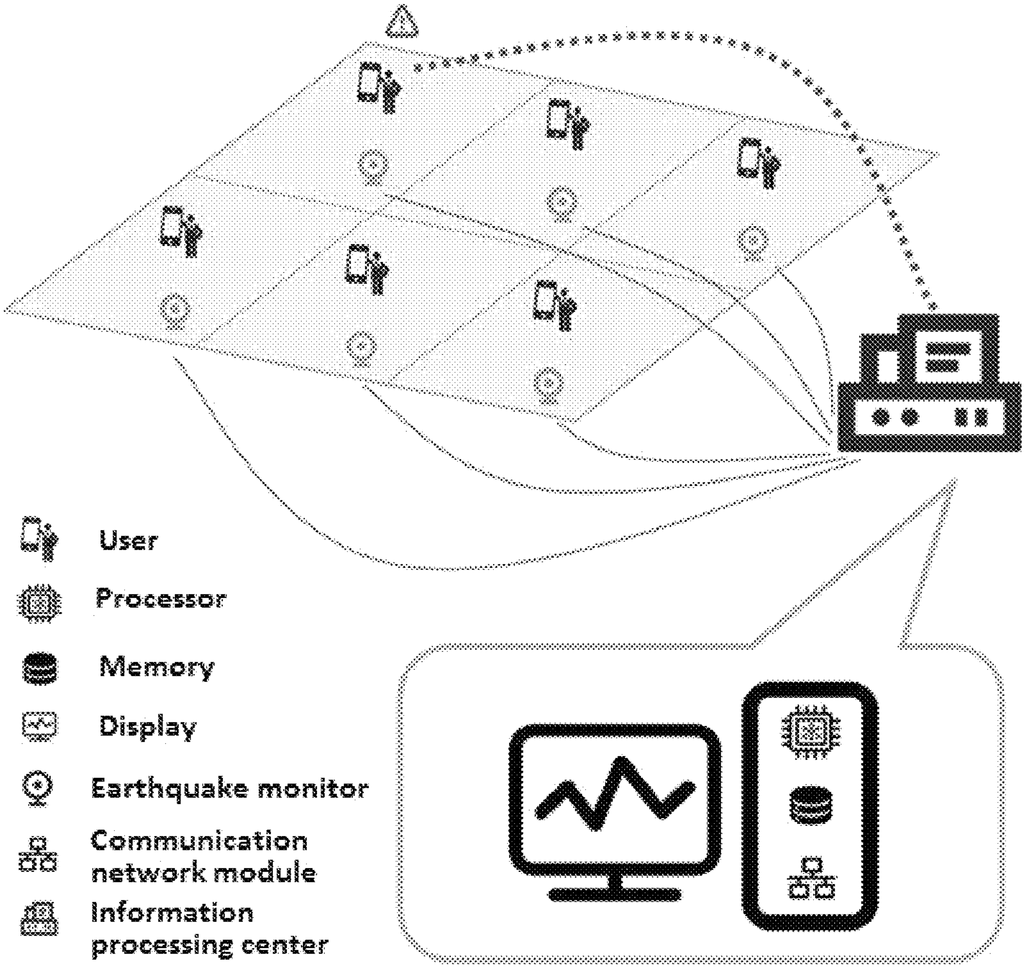
FIG. 5 is a schematic system deployment diagram of the earthquake perception data applied to Embodiment 1 according to the present disclosure.

If the threshold is not exceeded, the system continues to perform earthquake perception data monitoring, data preprocessing, earthquake perception prediction, etc. The actual deployment of the system is shown in FIG. 5. This embodiment is deployed and demonstrated by laboratory server equipment for the purpose of simplification. In this embodiment, a virtual earthquake perception data monitoring network is constructed to replace the function of earthquake monitors, a storage hard disk of a server itself realizes the function of a memory and is used for saving original earthquake perception data and a computer software program of implementing, in programming languages, methods for pre-processing earthquake perception data and predicting spatio-temporal feature information based on graph neural network fusion perception data, and all methods provided in the present disclosure, and a chip of the server itself realizes the function of a processor. A GPU realizes the function of a dedicated processor and is specially responsible for constructing and training a graph neural network model to increase the calculation speed; and a CPU realizes the function of a general-purpose processor and is responsible for other tasks of the information processing center, that is, executing other remaining tasks in the computer software program. When the processor calculates the prediction results, it will determine by itself whether any element value (i.e. earthquake magnitude) in the prediction results exceeds the specified threshold, so as to execute whether to send simulated early warning information to the region corresponding to the element value exceeding the threshold in the prediction results. The early warning information may be sent via peer to peer or via broadcasting. The broadcasting may be done by wired or wireless media such as a cable wire, a radio, television, internet link etc. Broadcasting may be implemented by various prior methods. For example, broadcasting may be implemented using a RDS scheme based on traditional cable FM broadcasting system. Based on the RDS coding technology, the system uses the RDS encoding and decoding function of the broadcast control host to encode and decode the broadcast signal, and then transmits the wireless frequency modulation signal through the coaxial cable or the wireless transmitter station.

In another example, broadcasting may be implemented using TS streaming broadcast scheme based on digital television system. Based on TS flow, the system transmits signals in accordance with determined encapsulation protocol and data format, under coordination of the broadcast system management platform, and form daily news broadcast instruction according to the need. The instructions are transmitted to digital TV front end, and multiple signals after multiplex confluence processing are modulated in the QAM modulator.

In another example, broadcasting may be implemented using all IP solution based on Internet.

Based on TCP/UDP technology, the system transmits audio signals in the form of IP packets in the local area network or wide area network. The core platform of the system is deployed in a computer room of management center, and each branch center can broadcast or shout to its jurisdiction through the IP network.

In one more example, it is possible to broadcast using, for example, the downlink physical multicast channel in a cellular network such as 4G LTE or 5G. In addition, the downstream physical channel for Internet of Things protocols, such as NB-IoT (Narrow Band Internet of Things), can also be used to broadcast messages.

During the experiment, an external monitor of the server can display the operation data results of the computer software program in a visual manner.

Embodiment 2: Step S1: Construct a perception data monitoring network, and acquire original perception data through data acquisition nodes in the perception data monitoring network.

Figure 6:
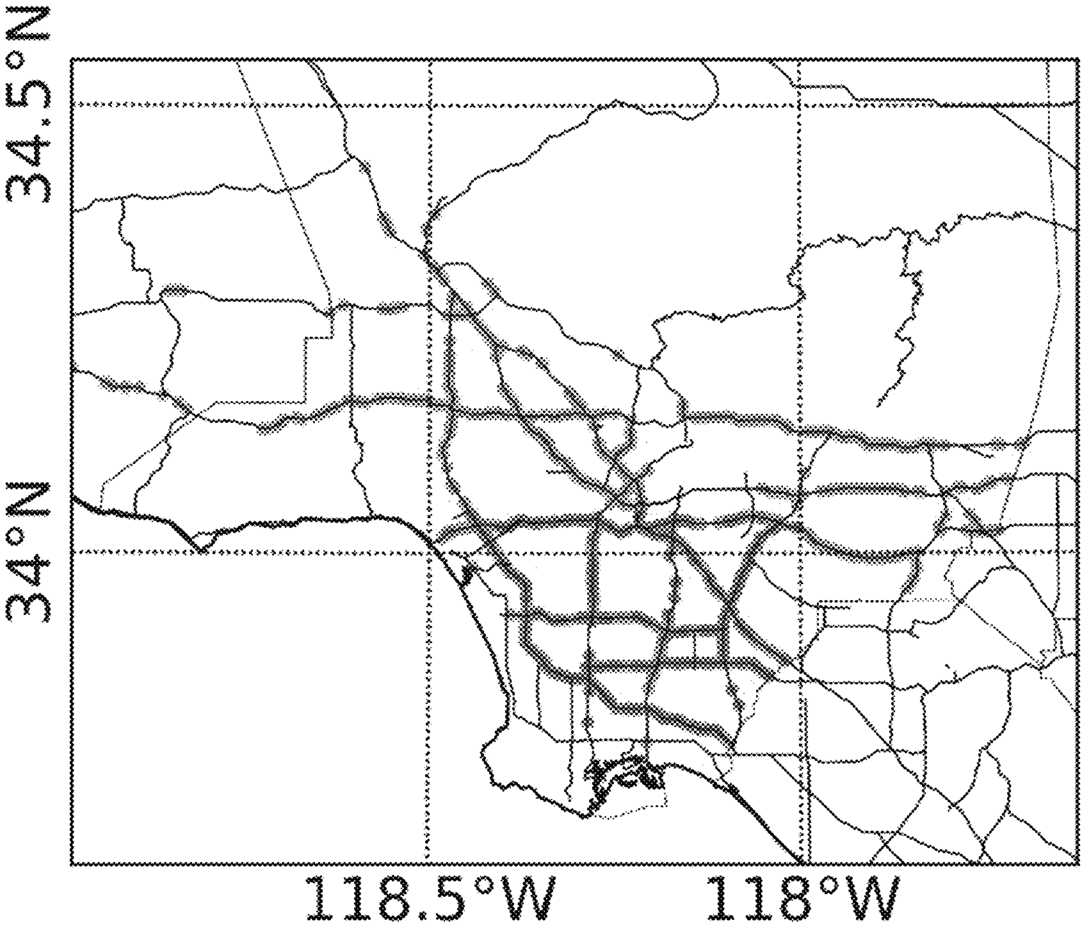
FIG. 6 is a schematic diagram of a traffic perception data monitoring network applied to Embodiment 2 according to the present disclosure.

A real traffic perception data monitoring network is constructed: a traffic flow data set PeMSD7 on some traffic sections in California, provided by the California Department of Transportation, is selected for test. The data set is collected by perceiving passing vehicles periodically through traffic flow monitors and communication network modules arranged at the road sections and intersections, and the recorded traffic flow data are sent to a data center. Therefore, the real traffic perception data monitoring network composed of a large number of traffic flow monitors set up by the California Department of Transportation is regarded as the real perception data monitoring network described in the present disclosure. The real traffic perception data monitoring network is shown in FIG. 6, in which each data acquisition node counts the number of passing vehicles at its location every 5 minutes as traffic flow information, and the traffic flow information, current time and location information are uploaded to the information processing center through a network for recording and storage. Because of the use of a real perception data monitoring network, all data acquisition nodes deployed, namely traffic flow monitors, update the traffic flow monitoring data periodically and synchronously, so that the time slice of each data acquisition node is the same, and all the data acquisition nodes record the same amount of traffic flow data within the same time slice.

Step S2: Pre-process the original perception data and convert the original perception data into spatio-temporal graph perception data.

Then the traffic flow data are processed into a matrix sequence in a chronological order, the matrix sequence being composed of a series of temporally continuous matrices, and each matrix representing traffic flow perception data in a time slice. In this embodiment, different traffic data monitors correspond to different monitoring regions. For the purpose of reducing experimental calculation overhead, 19×12=228 nearby data acquisition nodes are selected as original data sources. Traffic flow is used as perception feature information. Therefore, in the traffic flow perception data of this embodiment, each matrix has a dimension of 19×12×1=228 elements. The arrangement position of an element in the matrix represents the relative position of the data acquisition node in the corresponding monitoring region. On the other hand, the value of the element represents traffic flow information monitored by the corresponding data acquisition node at the current time. A series of processed traffic flow matrix sequence data are the traffic flow spatio-temporal graph perception data. The matrices themselves represent spatial information, and the sequence of the matrices represents temporal information. In different time periods, the values of the elements in the traffic flow spatio-temporal graph perception data change, indicating that the traffic flow data monitored by the data acquisition nodes at different positions change in different times. These traffic flow spatio-temporal graph perception data will be input to a subsequent information processing module.

The matrix sequence constitutes a spatio-temporal graph: $G_t=(V_1,E,W)$, where $V_t$ represents a set of data acquisition nodes, i.e., real traffic flow monitors at time t; E represents a set of edges, that is, the relationship between two traffic flow monitors; W represents an adjacency matrix and records the weight of each edge in the set of edges, and the adjacency matrix W remains unchanged at different times; The adjacency matrix is:

$$W_{ij}=\begin{cases} I(i,j)\cdot\exp\left(\frac{d_{ij}^2}{\sigma^2}\right), & i\neq j \text{ and } \exp\left(\frac{d_{ij}^2}{\sigma^2}\right)\geq\varepsilon, \\ 0, & \text{other cases} \end{cases}$$

Herein, I(i,j) represents the degree of correlation between respective locations of the traffic flow monitor i and the traffic flow monitor j, that is, the degree of correlation between road sections or intersections, within a value range of 0-1; in this embodiment, I(i,j) is simplified to be 1, and the adjacency matrix is completely determined by the distance relationship; $d_{ij}$ represents the distance between the data acquisition node i and the data acquisition node j, σ and ε are used to adjust the distribution and sparsity of the adjacency matrix W.

In this embodiment, σ=10 and ε=0.5. This experiment only selects traffic flow feature information, so the feature dimension is 1.

Step S3: Construct a graph neural network model according to the summary of the disclosure, and train parameters of the graph neural network model by using the traffic flow perception data processed into a spatio-temporal graph, where the selected loss function is still the distance measure between the predicted value $\hat{v}$ and the real value $v_{t+1}$: $L=\|\hat{v}-v_{t+1}\|^2$. During the training process, training data are input to the model in batches, and the parameters of the model are gradually adjusted so that the loss function gradually decreases on the training set until convergence, or the value of the loss function is lower than a set threshold, then the training is stopped, and the final graph neural network model is saved.

Step S4: Input historical traffic flow perception data processed into a spatio-temporal graph to the trained graph neural network model and output traffic flow perception data for predicting the future, and send simulated early warning information when the predicted value of a region at a certain time, that is, the traffic flow, exceeds a preset threshold. The early warning information may be sent via peer to peer or via broadcasting. The broadcasting may be done by wired or wireless media such as a cable wire, a radio, television, internet link etc. Broadcasting may be implemented by various prior methods. For example, broadcasting may be implemented using a RDS scheme based on traditional cable FM broadcasting system. Based on the RDS coding technology, the system uses the RDS encoding and decoding function of the broadcast control host to encode and decode the broadcast signal, and then transmits the wireless frequency modulation signal through the coaxial cable or the wireless transmitter station.

In another example, broadcasting may be implemented using TS streaming broadcast scheme based on digital television system. Based on TS flow, the system transmits signals in accordance with determined encapsulation protocol and data format, under coordination of the broadcast system management platform, and form daily news broadcast instruction according to the need. The instructions are transmitted to digital TV front end, and multiple signals after multiplex confluence processing are modulated in the QAM modulator.

In another example, broadcasting may be implemented using all IP solution based on Internet.

Based on TCP/UDP technology, the system transmits audio signals in the form of IP packets in the local area network or wide area network. The core platform of the system is deployed in a computer room of management center, and each branch center can broadcast or shout to its jurisdiction through the IP network.

In one more example, it is possible to broadcast using, for example, the downlink physical multicast channel in a cellular network such as 4G LTE or 5G. In addition, the downstream physical channel for Internet of Things protocols, such as NB-IoT (Narrow Band Internet of Things), can also be used to broadcast messages.

Figure 7:
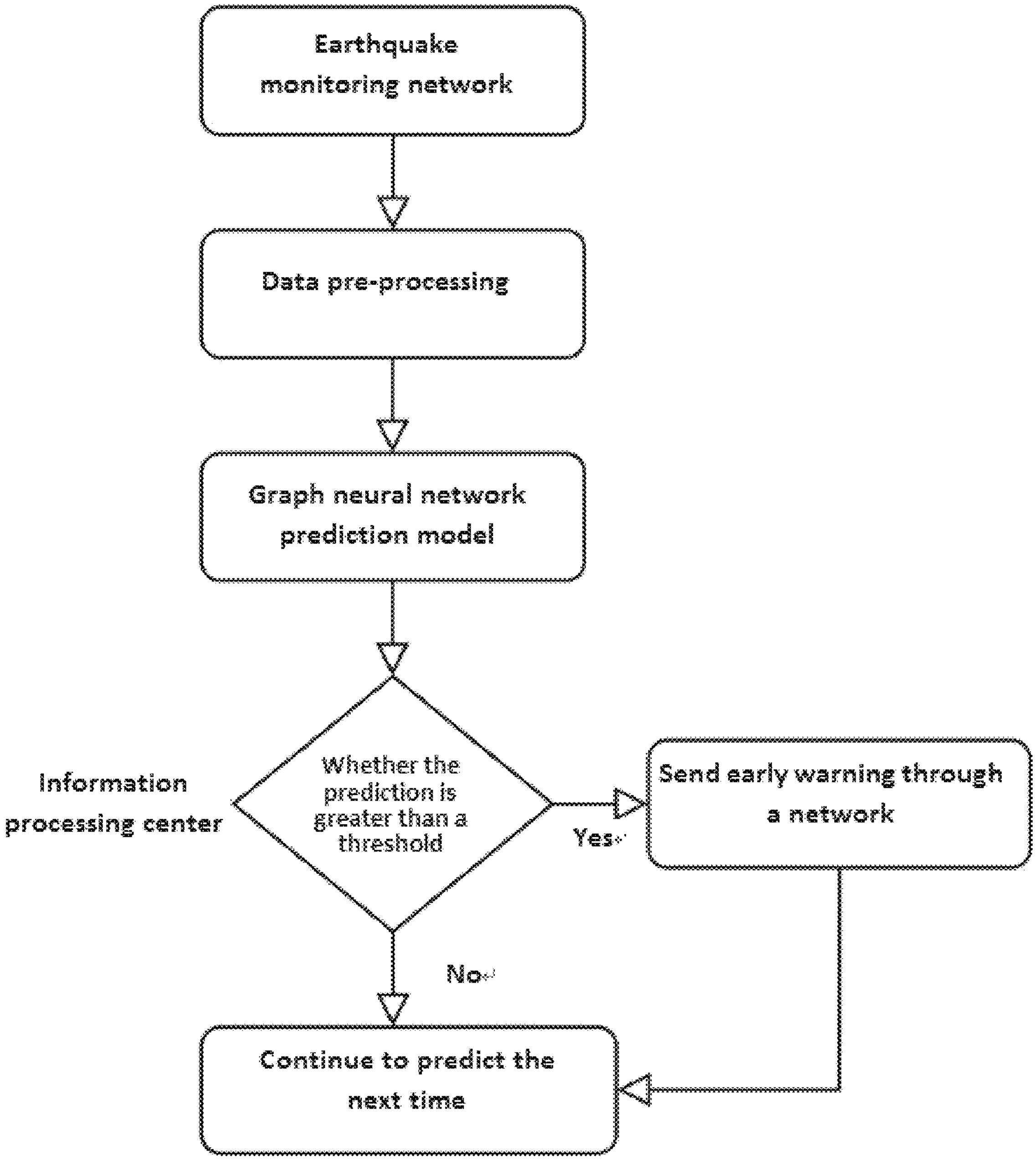
FIG. 7 is a system structure block diagram of traffic perception data applied to Embodiment 2 according to the present disclosure.
Figure 8:
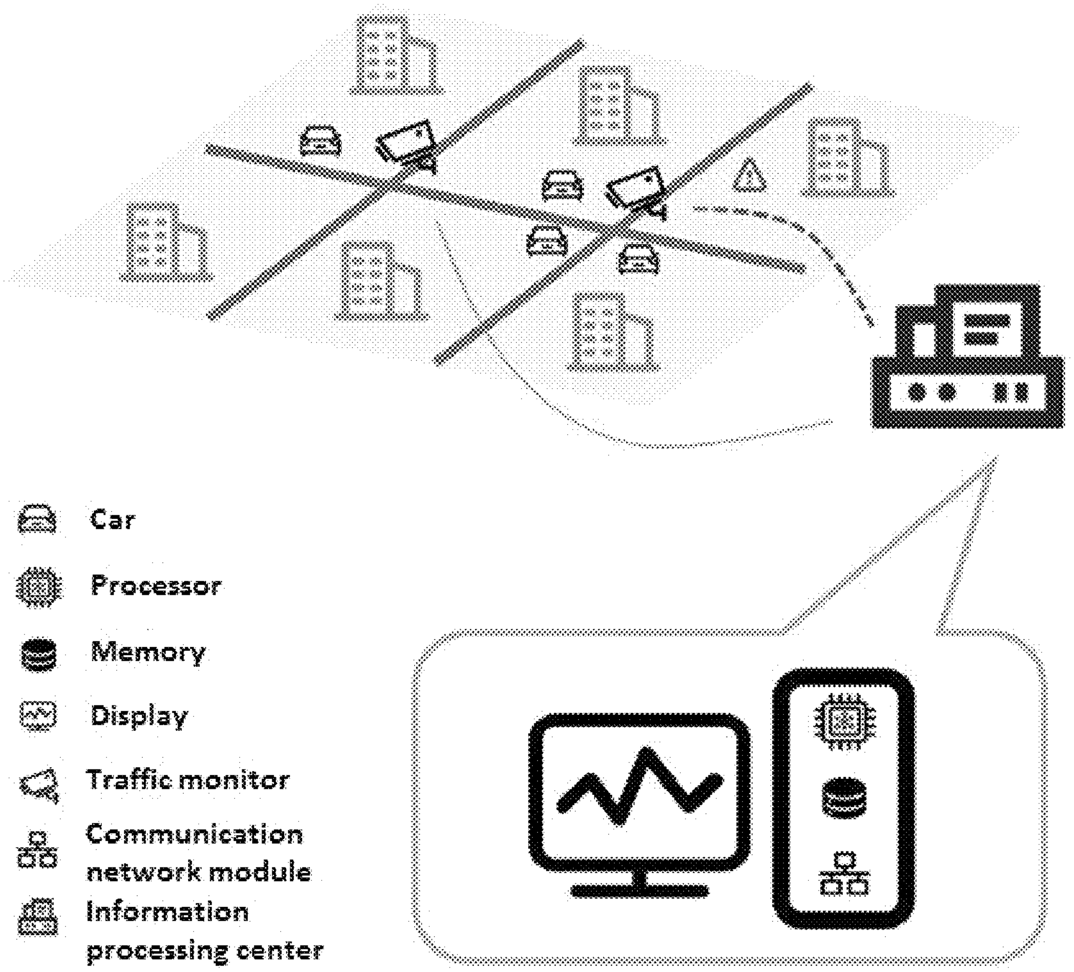
FIG. 8 is a schematic system deployment diagram of the traffic perception data applied to Embodiment 2 according to the present disclosure.

Finally, when this embodiment is applied to traffic flow perception data to carry out spatio-temporal feature information prediction, the overall system structure block diagram is shown in FIG. 7. The entire system is managed by a centralized information processing center. First, a real traffic flow perception data monitoring network, generally a real traffic monitoring network, is used to monitor traffic flow information and save the information in a storage module of the information processing center. Second, a data pre-processing module pre-processes traffic flow perception data in a memory of the information processing center, and converts the same into spatio-temporal graph data in the form of a matrix sequence for output. Then, according to a spatio-temporal feature information prediction method based on graph neural network fusion perception data, the information processing center selects a large amount of traffic flow spatio-temporal graph data as a set of training samples, constructs a graph neural network model, trains the graph neural network model by using the training samples, and inputs given traffic flow spatio-temporal graph data after the training is completed, to predict traffic flow spatio-temporal graph data, that is, traffic flow information of different monitoring sites within a period of time in the future. Finally, according to the prediction information, a perception data prediction module sends early warning information to the region where the corresponding data acquisition node is located and its adjacent regions if the value of the traffic flow in the predicted value exceeds a threshold, to remind people that the traffic flow in this region is large and congestion may occur, for making route planning in advance. At the same time, the traffic management department is also notified of the early warning information in time, and the traffic management department conducts traffic dispersion and control according to the situation. If the threshold is not exceeded, the system continues to perform traffic flow data monitoring, data pre-processing, traffic flow perception prediction, etc. The actual deployment of the system is shown in FIG. 8. A storage hard disk of a server itself realizes the function of a memory and is used for saving traffic flow data and a computer software program of implementing, in programming languages, methods for pre-processing traffic flow perception data and predicting spatio-temporal feature information based on graph neural network fusion perception data, and all methods provided in the present disclosure, and a chip of the server itself realizes the function of a processor. A GPU realizes the function of a dedicated processor and is specially responsible for constructing and training a graph neural network model to increase the calculation speed; and a CPU realizes the function of a general-purpose processor and is responsible for other tasks of the information processing center, that is, executing other remaining tasks in the computer software program. When the processor calculates the prediction results, it will determine by itself whether any element value in the prediction results exceeds the specified threshold, so as to execute whether to send simulated early warning information to the region corresponding to the element value exceeding the threshold in the prediction results. The early warning information may be sent via peer to peer or via broadcasting. The broadcasting may be done by wired or wireless media such as a cable wire, a radio, television, internet link etc. Broadcasting may be implemented by various prior methods. For example, broadcasting may be implemented using a RDS scheme based on traditional cable FM broadcasting system. Based on the RDS coding technology, the system uses the RDS encoding and decoding function of the broadcast control host to encode and decode the broadcast signal, and then transmits the wireless frequency modulation signal through the coaxial cable or the wireless transmitter station.

In another example, broadcasting may be implemented using TS streaming broadcast scheme based on digital television system. Based on TS flow, the system transmits signals in accordance with determined encapsulation protocol and data format, under coordination of the broadcast system management platform, and form daily news broadcast instruction according to the need. The instructions are transmitted to digital TV front end, and multiple signals after multiplex confluence processing are modulated in the QAM modulator.

In another example, broadcasting may be implemented using all IP solution based on Internet.

Based on TCP/UDP technology, the system transmits audio signals in the form of IP packets in the local area network or wide area network. The core platform of the system is deployed in a computer room of management center, and each branch center can broadcast or shout to its jurisdiction through the IP network.

In one more example, it is possible to broadcast using, for example, the downlink physical multicast channel in a cellular network such as 4G LTE or 5G. In addition, the downstream physical channel for Internet of Things protocols, such as NB-IoT (Narrow Band Internet of Things), can also be used to broadcast messages.

During the experiment, an external monitor of the server can display the operation data results of the computer software program in a visual manner.

Corresponding to the foregoing embodiment of the method for predicting spatio-temporal perception information based on a graph neural network, the present disclosure further provides an embodiment of an apparatus for predicting spatio-temporal perception information based on a graph neural network.

Figure 9:
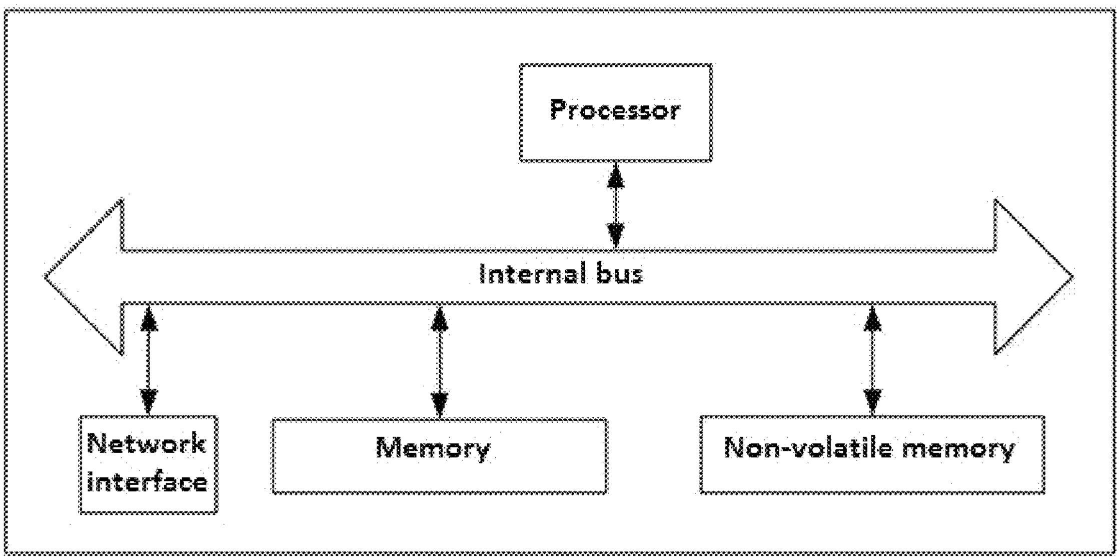
FIG. 9 is a schematic structural diagram of an apparatus for predicting spatio-temporal perception information based on a graph neural network according to the present disclosure.

With reference to FIG. 9, an apparatus for predicting spatio-temporal perception information based on a graph neural network, provided by an embodiment of the present disclosure, is deployed and used by means of the following devices, including a perception data monitor, a network communication device, a memory, a processor, a display, and a computer software program stored in the memory and executable on the processor, wherein the perception data monitor and the network communication device construct a perception data monitoring network, the data obtained by the perception data monitoring network is stored in the memory, the processor executes the computer software program to implement the method for predicting spatio-temporal perception information based on a graph neural network according to any one of the above embodiments, and the display displays the data results obtained by the processor executing the computer software program in a visual manner.

The embodiment of the apparatus for predicting spatio-temporal perception information based on a graph neural network according to the present disclosure can be applied to any device with data processing capability, which can be a device or apparatus such as a computer. The embodiment of the apparatus can be implemented by software, hardware, or a combination of hardware and software. Taking the software implementation as an example, the logical apparatus is formed by reading corresponding computer program instructions in a non-volatile memory into a memory through a processor of any device with data processing capability where the apparatus is located. In terms of hardware, FIG. 9 shows a hardware structure diagram of any device with data processing capability where the apparatus for predicting spatio-temporal perception information based on a graph neural network is located. Except the processor, memory, network interface and non-volatile memory shown in FIG. 9, the any device with data processing capability where the apparatus is located in the embodiment may further include other hardware according to its actual function. Details are not described herein.

Details of the implementation processes of the functions and effects of the units in the above-mentioned apparatus are shown the implementation processes of the corresponding steps in the above-mentioned method, and the details are not described herein.

The embodiment of the apparatus substantially corresponds to the embodiment of the method, so relevant parts may refer to the parts of the embodiment of the method. The apparatus examples described above are merely illustrative. The units described as separate components may or may not be physically separated, and the components displayed as units may or may not be physical units, that is, they may be located in one place, or may be distributed to a plurality of network units. Some or all of the modules may be selected according to actual needs to achieve the objectives of the solutions of the present disclosure. Those of ordinary skill in the art can understand and implement without any creative effort.

An embodiment of the present disclosure further provides a computer software program, which implements the method for predicting spatio-temporal perception information based on a graph neural network according to any one of the above embodiments, and is deployed in a processor or a cloud server.

Described above are merely preferred embodiments of the present disclosure, and the present disclosure is not limited thereto. Various modifications and variations may be made to the present disclosure for those skilled in the art. Any modification, equivalent substitution or improvement made within the spirit and principle of the present disclosure shall fall into the protection scope of the present disclosure.

What is claimed is:

1. A method for predicting spatio-temporal perception information based on a graph neural network, comprising:

constructing a perception data monitoring network, and acquiring original perception data through data acquisition nodes in the perception data monitoring network;

pre-processing and converting the original perception data into spatio-temporal graph perception data;

constructing a graph neural network model, and training parameters of the graph neural network model by using the spatio-temporal graph perception data; and sending early warning information in response to a predicted value output by the graph neural network model exceeding a preset threshold;

wherein pre-processing the original perception data comprises performing time slicing on the original perception data and processing the original perception data into a matrix sequence in chronological sequence;

wherein elements in the matrix sequence correspond to the data acquisition nodes, arrangement positions of the elements in the matrix sequence correspond to spatial feature information of the data acquisition nodes, values of the elements in the matrix sequence correspond to temporal feature information of the data acquisition nodes at a current time, and the matrix sequence constitutes the spatio-temporal graph perception data;

wherein the matrix sequence constitutes a spatio-temporal graph: $G_t=(V_t,E,W)$, where $V_t$ represents the data acquisition nodes at time t, and features of the data acquisition nodes represent feature information of perception data recorded by the data acquisition nodes; E represents a set of edges, and each edge in the set of edges represents a relationship between two data acquisition nodes among the data acquisition nodes; and W represents an adjacency matrix that records a weight of each edge in the set of edges;

wherein the adjacency matrix is:

$$W_{ij} = \begin{cases} I(i,j)\cdot \exp\left(\frac{d_{ij}^2}{\sigma^2}\right), & i \neq j \text{ and } \exp\left(\frac{d_{ij}^2}{\sigma^2}\right) \geq \varepsilon, \\ 0, & \text{other cases} \end{cases}$$

where I (i,j) represents a degree of correlation between respective locations of the data acquisition node i and the data acquisition node j within a value range of 0-1, among the data acquisition nodes; $d_{ij}$ represents a distance between the data acquisition node i and the data acquisition node j, σ and ε respectively represent a distribution and a sparsity of the adjacency matrix.

2. The method according to claim 1, wherein constructing the perception data monitoring network comprises constructing a real perception data monitoring network or a virtual perception data monitoring network.

3. The method according to claim 2, wherein the data acquisition nodes in the real perception data monitoring network comprise a data monitor and a communication network module, the data acquisition nodes are arranged in a matrix.

4. The method according to claim 2, wherein constructing the virtual perception data monitoring network comprises performing coordinate grid division on a monitoring region to obtain a plurality of grid regions, virtualizing virtual data acquisition nodes corresponding to the grid regions, mapping historical perception data into the grid regions according to a location of occurrence of the historical perception data, and regarding the historical perception data as original perception data recorded by the virtual data acquisition nodes.

5. The method according to claim 1, wherein the graph neural network model comprises an input layer, a spatio-temporal graph convolution module and an output layer, wherein the spatio-temporal graph convolution module is composed of two first temporal domain convolution modules and a spatial domain convolution module therebetween, and the output layer is composed of a second temporal domain convolution module and a fully connected layer.

6. The method according to claim 5, wherein the two first temporal domain convolution modules are configured to: divide an input into two paths, perform a sigmod operation on one path among the two paths and an addition operation with a residual on the other path among the two paths after one-dimensional convolution, and output results of the two paths through a Hadamard product; wherein the two first temporal domain convolution modules are configured to perform the one-dimensional convolution on input spatio-temporal graph data $X\in R^{M\times n\times C_i}$ along a time dimension, where M represents a total of M times in the spatio-temporal graph, n represents a number of the data acquisition nodes in the monitoring region, and $C_i$ represents a dimension at which the data acquisition nodes record features; a size of a temporal domain convolution kernel is $\Gamma\in R^{K_t\times C_i}$, a number of the temporal domain convolution kernels is $2C_o$, and the spatio-temporal graph is $Y\in R^{(M-K_t+1)\times n\times C_o}$.

7. The method according to claim 5, wherein the spatial domain convolution module is configured to: perform a graph convolution operation on an input to obtain spatial feature information and output the spatial feature information; wherein graph data corresponding to each time on the spatio-temporal graph output by the first temporal domain convolution modules is input $X\in R^{n\times C_o}$ and subjected to graph convolution according to the Chebyshev approximation, a size of each spatial convolution kernel selected during the graph convolution is $\theta\in R^{K\times C_o}$, where K=2, and a number of the convolution kernels is $C_i$, and an output is $Y\in R^{(M-K_t+1)\times n\times C_i}$.

8. The method according to claim 5, wherein each time spatio-temporal graph perception data pass through one of the two first temporal domain convolution modules, a time dimension is reduced by $(K_t-1)$.

9. The method according to claim 5, wherein a size of each convolution kernel of the second temporal domain convolution module is $\Gamma\in R^{(M-2(K_t-1))\times C_o}$, a number of convolution kernels is $C_o$, an output after the second temporal domain convolution module is $Z\in R^{n\times C_o}$, the fully connected layer is $\hat{v}=Zw+b$, where the parameters are $w\in R^{C_o}$ and $b\in R^n$, and a predicted value $\hat{v}\in R^n$ is output by the output layer; wherein a loss function is a distance measure between the predicted value $\hat{v}$ and the real value $v_{t+1}$: $L=\|\hat{v}-v_{t+1}\|^2$.

10. A computer program product comprising a non-transitory computer readable medium having instructions recorded thereon, the instructions when executed by a computer implementing the method according to claim 1.

* * * * *